Dec. 30, 1930.  C. E. FREDERICKSON  1,786,906
FRAME AND SPRING SUSPENSION FOR MOTOR VEHICLES
Filed June 15, 1929
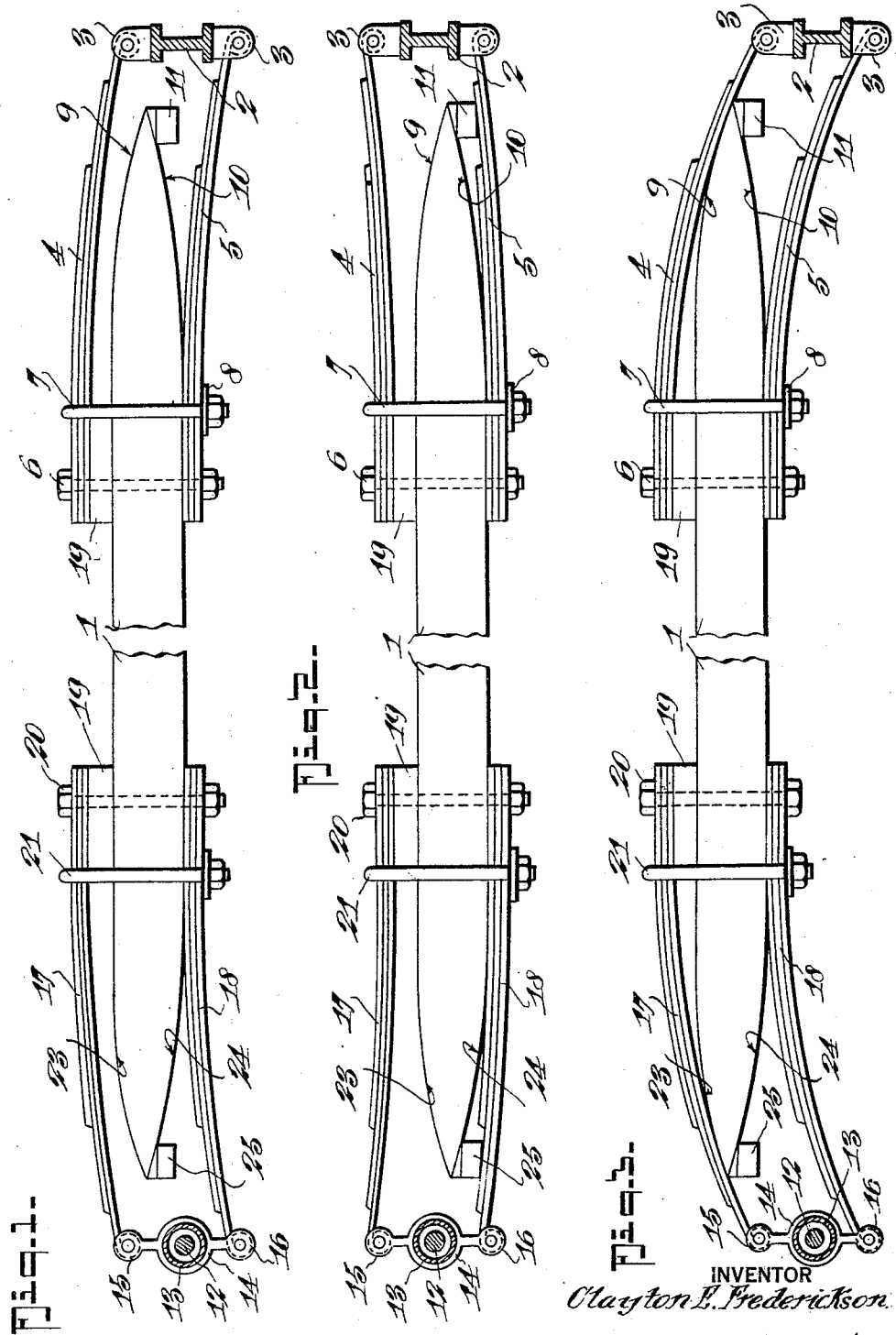

Patented Dec. 30, 1930

1,786,906

UNITED STATES PATENT OFFICE

CLAYTON E. FREDERICKSON, OF MOLINE, ILLINOIS, ASSIGNOR, BY MESNE ASSIGNMENTS, TO THOMPSON MOTOR CORPORATION, OF MUSCATINE, IOWA

FRAME AND SPRING SUSPENSION FOR MOTOR VEHICLES

Application filed June 15, 1929. Serial No. 371,219.

My invention has for its object to provide certain new and useful improvements in frame-spring suspensions for light motor vehicles in order to improve their riding qualities, absorb road shocks and reduce vibration as much as possible.

Another object is to provide a spring suspension for motor vehicle frames of such construction and design that the rise and fall of the frame with respect to the axles will be so restrained as not to interfere with proper functioning of the power transmitting shaft.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawing:

Figure 1 is a side elevation of a motor vehicle frame with springs connected to the front and rear axle structures, the latter being shown in cross section and the parts being in the normal or rest position.

Figure 2 is a view similar to Figure 1 showing the position of the parts when the axles have raised as far as possible (the frame relatively lowered to maximum degree) as in going over obstructions of unusual character.

Figure 3 is a view similar to Figures 1 and 2 showing the position of the parts at the maximum rebound of the frame.

In the drawing, in which like numerals of reference indicate like parts in all of the figures, 1 represents the frame, 2 the front axle with which is integrally formed the upper and lower shackle eyes 3. 4 designates the upper front spring pack, 5 the lower front spring pack, which packs are secured to the frame 1 by means of a spring tie bolt 6 and a spring clip 7, the bolt 6 passing through the springs and the frame beam while the clip 7 passes over the same. A spring clip strap plate 8 is provided beneath the lower spring pack 5 as usual in securing springs to frame beams.

It will also be noted that the upper and under surfaces of the frame beam 1 at the front are convexed as at 9 and 10 respectively, the purpose for which will presently appear, and a rubber bumper 11 is secured to the frame adjacent its extreme end to cooperate with the lower spring pack 5 as will later be made clear.

The rear axle 12 is provided with the usual housing 13 on which is swivelly mounted a swivel member 14 having upper and lower shackle eyes 15 and 16 respectively, to which the rear ends of the upper and lower spring packs 17 and 18 at the rear of the frame are pivotally connected. The spring packs 17 and 18 are secured to the frame in a manner similar to the front spring packs, i. e. by means of a tie bolt 20, a tie clip 21 having a strap 22 passing beneath the lower spring pack 18 as shown.

The upper and lower surfaces of the frame beam 1, where the same extends between the rear spring packs 17 and 18, are convexed as at 23 and 24, and a rubber bumper 25 is provided at the front. In order to raise the upper spring packs sufficiently to allow for normal spring clearance, a spacer block 19 may be interposed between the frame 1 and the upper spring packs 4 and 17 where they are secured to the frame.

In practice the curvatures of the convexities 9, 10, 23 and 24 are so designed as to cooperate with the spring packs and so as to oppose no sharp edges thereto. As will be noted from Figure 2 of the drawing when the axles raise in going over obstructions or the body drops, the lower spring packs will engage the convexed surfaces 10 and 24 respectively with a rolling engagement. This prevents breakage of the springs which might occur where the ends of the frame square cut as usual. Likewise by reference to Figure 3 it will be seen that on the dropping of the wheels into ruts or the rebound of the frame upwardly the upper spring packs will have rolling contact with the upper convexed portions 9 and 23 of the frame beam which will prevent breakage of the upper springs. Furthermore the engagement between the spring packs and the convexed surfaces results in a more gradual absorption of shock and dampens vibration of the frame due to road shocks.

Other advantages of the invention will be clear to those skilled in the art.

What I claim is:

1. A frame including longitudinal beams having the upper and lower surfaces at their ends convexed, upper and lower leaf spring packs secured each at one end to the frame to project beyond the ends of the frame beams and cooperate with said convexed surfaces, front and rear axle structures, upper and lower shackle eyes carried by said structures to which the outer ends of said spring packs are pivotally secured the ends of said frame projecting between the spring packs.

2. A frame including longitudinal beams having the upper and lower surfaces at their ends convexed, upper and lower leaf spring packs secured each at one end to the frame to project beyond the ends of the frame beams and cooperate with said convexed surfaces, front and rear axle structures, upper and lower shackle eyes carried by said structures to which the outer ends of said spring packs are pivotally secured, and a bumper located beneath the ends of said longitudinal beams to engage with the lower spring pack at times the ends of said frame projecting between the spring packs.

3. In motor vehicles, a frame including longitudinal beams, front and rear, upper and lower leaf spring packs, spring tie bolts passing through said upper and lower spring packs and said frame beams, spring clip bolts also securing the spring packs to the frame beams, said spring packs substantially paralleling the frame beams and projecting beyond the ends thereof, a front axle having upper and lower rigid shackle eyes to which the front ends of the front upper and lower spring packs are secured, a rear axle with housing, swivel members on the rear axle housing having upper and lower shackle eyes to which the rear ends of the rear upper and lower spring packs are secured, said longitudinal end beams having their ends extended between the upper and lower spring packs a substantial distance beyond the places where the spring packs are secured, to cooperate with the flexing portions of the spring packs.

4. In motor vehicles, a frame including longitudinal beams, front and rear, upper and lower, leaf spring packs, spring tie bolts passing through said upper and lower spring packs and said frame beams, spring clip bolts also securing the spring packs to the frame beams, said spring packs paralleling the frame beams and projecting beyond the ends thereof, a front axle having upper and lower rigid shackle eyes to which the front ends of the front upper and lower spring packs are secured, a rear axle with housing, swivel members on the rear axle housing having upper and lower shackle eyes to which the rear ends of the rear upper and lower spring packs are secured, the frame ends which lie between said upper and lower spring packs being convexed.

5. In motor vehicles, a frame including longitudinal beams, front and rear, upper and lower, leaf spring packs, spring tie bolts passing through said upper and lower spring packs and said frame beams, spring clip bolts also securing the spring packs to the frame beams, said spring packs paralleling the frame beams and projecting beyond the ends thereof, a front axle having upper and lower rigid shackle eyes to which the front ends of the front upper and lower spring packs are secured, a rear axle with housing, swivel members on the rear axle housing having upper and lower shackle eyes to which the rear ends of the rear upper and lower spring packs are secured, the frame ends which lie between said upper and lower spring packs being convexed, and bumpers carried by the ends of the longitudinal frame beams to engage with the lower spring packs.

6. A frame including longitudinal beams, upper and lower leaf spring packs secured adjacent but back from the ends of said beams and projecting beyond said ends, front and rear axle members having rigid upper and lower shackle eyes to which the ends of said springs are respectively pivoted whereby said frame may rise and fall with respect to said axles above and below a horizontal plane containing said axles, the ends of said beams projecting beyond the places where the spring packs are secured a substantial distance to cooperate with the flexing portions of the spring packs.

CLAYTON E. FREDERICKSON.